June 4, 1940.   J. J. ETTINGER   2,203,193
FOLDING LITTER
Filed Feb. 27, 1940   3 Sheets-Sheet 1
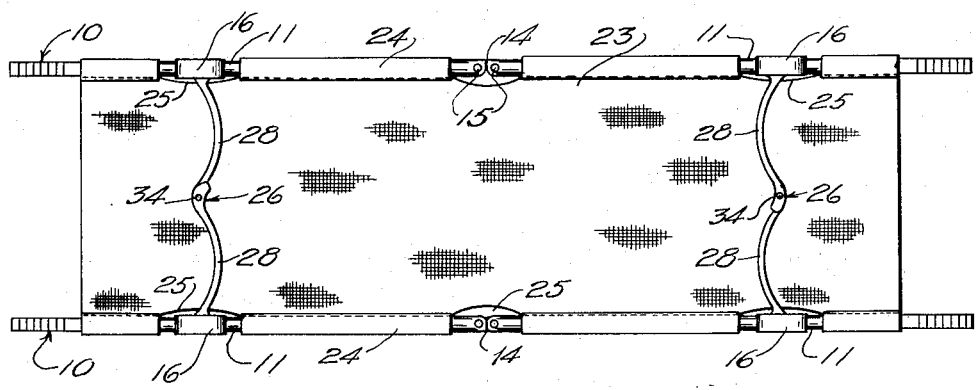
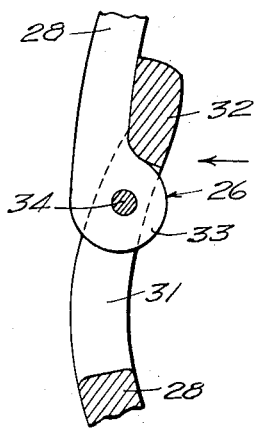
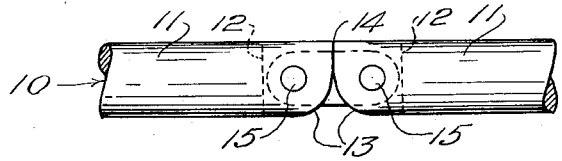
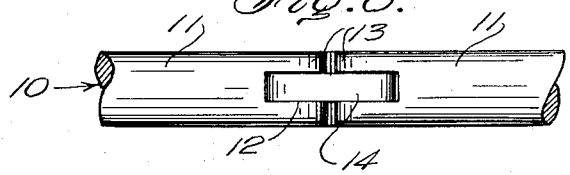
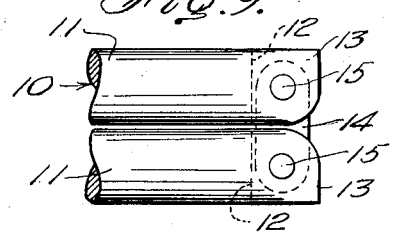

June 4, 1940.  J. J. ETTINGER  2,203,193
FOLDING LITTER
Filed Feb. 27, 1940  3 Sheets-Sheet 2

Inventor
J. J. ETTINGER,
By
Attorney

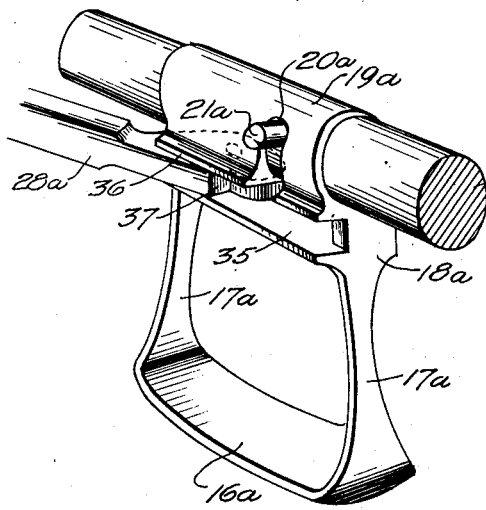
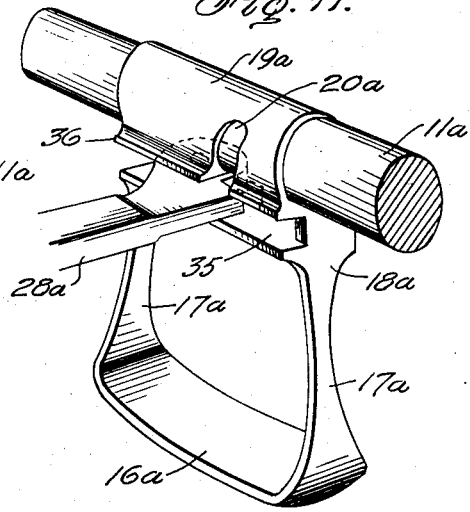
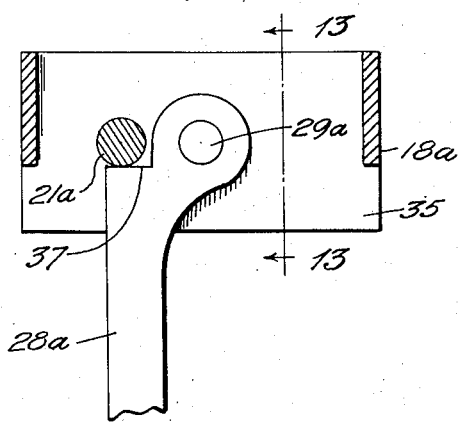
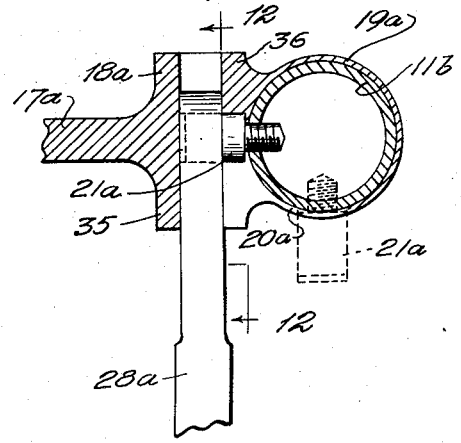

Patented June 4, 1940

2,203,193

UNITED STATES PATENT OFFICE 2,203,193

FOLDING LITTER

Joe J. Ettinger, Warsaw, Ind.

Application February 27, 1940, Serial No. 321,114

8 Claims. (Cl. 5—82)

This invention relates to litters such as are used for the purpose of carrying injured and sick persons. More especially the invention relates to a folding litter which can be collapsed and folded up to occupy a relatively small space.

One important object of the invention is to provide a novel construction of litter having carrying poles which are jointed to fold upon each other, the joints being foldable in one position and resisting folding in a second position.

A second important object of the invention is to provide a litter of this character having novel means to prevent the carrying poles from moving out of the position in which they cannot be folded.

The third important object of the invention is to provide a litter of this character wherein the litter has stretching bars so constructed and arranged that when in use the jointing sections of the carrying poles will be prevented from collapsing toward each other in the joints.

With the above and other objects in view, as will be presently understood, the invention consists in general of certain novel details of construction and combination of parts hereinafter fully described, illustrated in the accompanying drawings, and particularly pointed out in the appended claims.

In the accompanying drawings, like characters of references indicate like parts in the several views, and:

Figure 1 is a bottom plan view of the litter in its expanded position.

Figure 6 is an enlarged fragmentary section showing the joint connecting the two sections of each stretcher bar.

Figure 7 is an enlarged fragmentary view showing the two sections of one of the carrying poles in side elevation with the hinge in position so that the sections may be folded one on the other.

Figure 8 is a plan view of the parts shown in Figure 7.

Figure 9 is a side elevation of the parts shown in Figure 7 but with one pole section folded on the other.

Figure 10 is a perspective view similar to Figure 2 but showing a second form of the invention with a pole section released for turning.

Figure 11 is a view similar to Figure 10 but with the pole section locked against turning.

Figure 12 is a section on the line 12—12 of Figure 13 and showing the second form of the invention.

Figure 13 is a section on the line 13—13 of the Figure 12.

Figure 2:
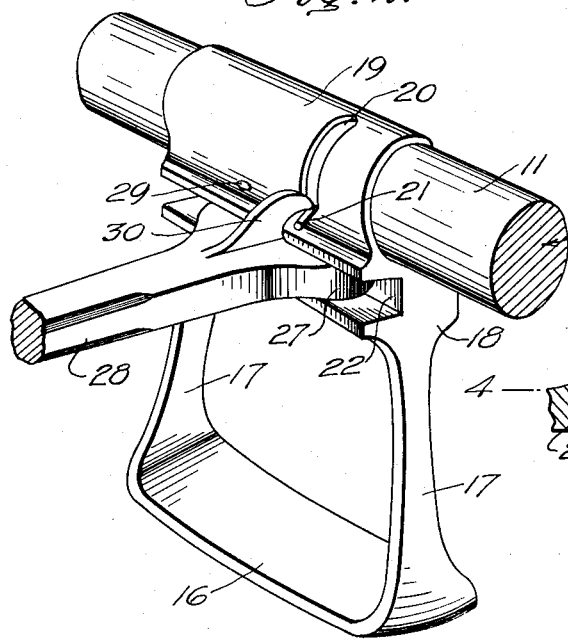
Figure 2 is a detailed perspective view showing the arrangement for preventing the handles of the poles of the litter from being rotated.
Figure 3:
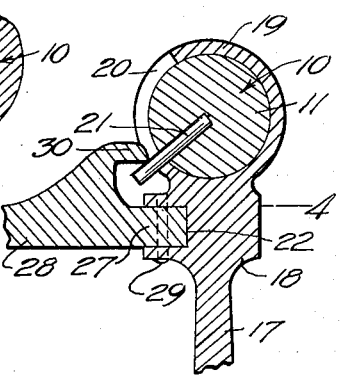
Figure 3 is a fragmentary section taken vertically through the structure shown in Figure 2 at a point just above the stretcher bar end there shown.

In one embodiment of the invention herein disclosed there is provided a pair of sectional litter poles indicated in general at 10 and each of these poles consists of two like sections 11. The sections 11 of each pole have their proximal ends provided with alined slots 12, these ends being rounded transversely of the slots as shown at 13. A metal plate 14 has its ends received in the slots 12 and is there held by means of pins 15 which provide pivotal connections between each end of the plate and a corresponding section of the stretcher pole. With this construction of the device it will be plain that one bar 11 may fold on the other as in Figure 9, the fold being in a plane at right angles to the axes of the pivot pins 15. It will also be obvious that the sections 11 will be held from folding in the plane wherein the axes of the pins 15 lie.

Figure 4:
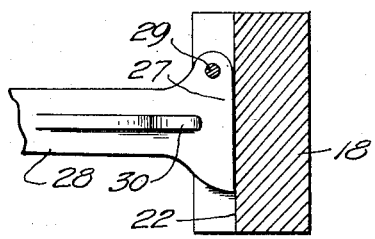
Figure 4 is a detailed section, particularly in elevation on the line 4—4 of Figure 3.
Figure 5:
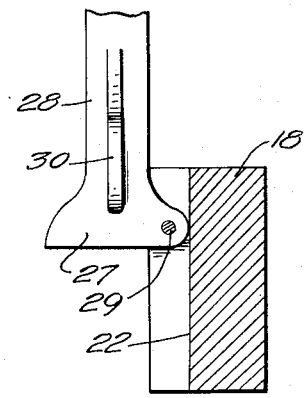
Figure 5 is a view similar to Figure 4 but with the portion of the stretcher bar there shown in the position assumed when the litter is collapsed.

In order to hold the litter raised from the ground when in use there is provided for each pole section 11 a leg having a base portion or foot 16 from the ends of which rise a pair of uprights 17 connected by a head 18 at their upper ends. Formed with the head 18 is a sleeve 19 where through the pole section 11 passes and in which it may be rotated. Extending circumferentially of the sleeve 19 is a slot 20. Extending radially from the pole section is a pin 21 which projects through the slot 20 so as to limit the rotational movement of the pole section 11. Each of the heads 18 has on its inner side a longitudinal slot 22. Between the two poles 10 extends a stretcher bed portion 23 formed of a strip of canvas or other suitable material and having tubular portions 24 at its longitudinal edges where through carrying poles 10 pass. The canvas between the tubular portions 24 is cut away as at 25 to accommodate the hinges and sleeves 19. From an inspection of Figure 1 it will be observed that the sleeves 19 are arranged in oppositely disposed pairs. Each pair of sleeves is connected by a stretcher bar having two sections pivoted together as at 26. The opposite ends of each stretcher bar are enlarged to form heads 27, each section of the stretcher bar being indicated at 28. These heads 27 are arranged to fit in the slots 22 and one side of the head is pivoted in said slot by a pivot 29 it being observed, from Figure 4, that when the litter is in position for use the heading will be against the inner face of slot 22 while, when the device is collapsed, the stretcher bar assumes the position shown in Figure 5. On each section 28 is carried a lug or hook 30 which, when the litter is expanded, engages over the pin 21. It is to be observed that when the poles 10 are rotated in such position that lug 30 will engage over the respective pin 21 the hinges between the pole sections will be disposed with the axes of the pins 15 at right angles to the plane of the canvas 23. This arrangement is shown in Figure 1 and it is obvious that under these conditions the free ends of the poles may be grasped and the litter lifted without its bending at the middle. When, however, the litter is collapsed and the stretcher bar sections moved to the position shown in Figure 5 the poles 10 can be rotated through a right angle so that the hinges connecting the pole sections will then have the axes of the pins 15 at right angles to their position of expansion so that one end of the litter may be folded over on the other.

It will be noted that the canvas may be bolted or otherwise secured to the poles.

The hinges 26 of the stretcher bars may be made in any preferred manner but in the present construction it will be seen that one of these bars is provided with a slotted head 31 closed at its end by a stop bar 32. The other cooperating bar 28 is provided with a flattened head 33 which fits in the slot 31 adjacent to bar 32 and is pivotally connected to the first mentioned section by a pin 34. Under these circumstances when the litter is expanded the stop bar 32 will engage against the shank of the other section 28 thus preventing any further movement in the direction of the arrow shown in Figure 6, this being the direction in which the parts are swung to expand the litter. However, the hinge 26 may be moved in a direction opposite the arrow and thus permit collapse of the litter. Obviously when the parts are engaged as in Figure 6 the pivot pin 34 will lie beyond the dead center connecting the pins 29 so that weight on the litter tends to retain the stretcher bars in the position assumed in the expanding of the litter. By this means accidental collapse of the litter is prevented.

When it is desired to collapse the litter from the expanded position shown in Figure 1 the hinges 26 are moved toward each other thus freeing the pins 21. The poles 10 are then given a quarter turn. As the hinges 26 move toward each other the poles are also drawn toward each other. The litter having thus been collapsed laterally may now be folded so that one end rests upon the other thus permitting the device to be stored in a small space.

In the second form of the invention as shown in Figures 10 to 13 the device has pole sections which may be either solid as shown at 11a or be tubular as shown at 11b. Ground engaging members 16a provided at each end with uprights 17a carry heads 18a. In this form each of the heads 18a comprises a lower plate 35 and an upper plate 36 which carries a sleeve 19a wherein the pole section is rotatably mounted. This sleeve is provided with a slot 20a which opens at its lower end through plate 36. Screwed into the pole section is a pin 21a which projects through the slot so that its projecting end may lie between the plates 35 and 36 in the position wherein the poles are located against rotation. The stretching or expansion members are here shown at 28a and each of these members is connected to a head 18a by a pivot pin 29a which is offset with respect to the body of the members 28a and an abrupt shoulder 37 is formed at the offset portion of the member 28a so that when swung in the position shown in Figures 11 and 12 this shoulder engages the pin 21a and locks it against the lower end of the slot 20a. In this arrangement of the device the pin, by its engagement with the lower end of the slot 20a, limits movement of the member 28a in one direction.

The operation of this form of the invention is identical with that of the previously described form.

What is claimed, is:

1. In a collapsible folding litter, a pair of sectional side poles each having a hinge at its central portion operable to permit folding of the pole sections on each other in one rotational position and to resist folding of the pole sections in a second rotational position, means rotatably supporting the pole sections remote from the hinges, said means being arranged in oppositely disposed pairs, folding stretcher bars connecting each pair of said means, and cooperating elements on said pole sections and stretcher bars arranged to prevent rotation of the poles into folding position upon the stretcher bars being in unfolded position and permitting rotation of the poles when said stretcher bars are in folded position.

2. In a collapsible folding litter, a pair of sectional side poles each having a hinge at its central portion operable to permit folding of the pole sections on each other in one rotational position and to resist folding of the pole sections in a second rotational position, means rotationally supporting the pole sections remote from the hinges, said means being arranged in oppositely disposed pairs, stretcher bars each consisting of a pair of pivotally connected sections having their remote ends pivoted to the respective means, pins projecting from the pole sections to rotate therewith, and means on said stretcher bar sections engaging said pins in litter stretching position and preventing rotation of said pole sections out of said second rotational position, said means disengaging said pins when the stretcher bars are in folded position and thereby permitting rotation of said pole sections to litter folding position.

3. In a collapsible folding litter, a pair of sectional side poles each having a hinge at its central portion operable to permit folding of the pole sections on each other in one rotational position and to resist folding of the pole sections in a second rotational position, sleeves arranged in oppositely disposed pairs and supporting said pole sections for rotation at points remote from the hinges, said sleeves having slots extending circumferentially thereof, pins extending from said pole sections and engaging in said slots, said slots and pins limiting rotation of the poles in said sleeves, stretcher bars each consisting of a pair of pivotally connected sections, pivot means connecting the ends of each stretcher bar to the sleeves of a respective pair, and lugs on said stretcher bar sections engaging over said pins upon the pins being located at those ends of the slots at which the hinges of the pole sections are in non-folding position, said lugs moving to disengage from the pins and permit rotating of the pole sections to folding position upon the stretcher bars being moved out of stretching position.

4. In a collapsible folding litter, a pair of sectional side poles each having a hinge at its central portion operable to permit folding of the pole sections on each other in one rotational position and to resist folding of the pole sections in a second rotational position, means rotatably supporting the pole sections remote from the hinges, said means being arranged in oppositely disposed pairs, folding stretcher bars connecting each pair of said means, and cooperating elements on said pole sections and stretcher bars arranged to prevent rotation of the poles into folding position upon the stretcher bars being in unfolded position, said stretcher bars and pole supporting means having cooperating portions engageable to limit relative pivoted movement between the bars and means upon the latter being in alinement on each pole and the litter expanded.

5. In a collapsible folding litter, a pair of sectional side poles each having a hinge at its central portion operable to permit folding of the pole sections on each other in one rotational position and to resist folding of the pole sections in a second rotational position, means rotationally supporting the pole sections remote from the hinges, said means being arranged in oppositely disposed pairs, stretcher bars each consisting of a pair of pivotally connected sections having their remote ends pivoted to the respective means, pins projecting from the pole sections to rotate therewith, and means on said stretcher bar sections engaging said pins in litter stretching position and preventing rotation of said pole sections out of said second position and disengaged from said pins in litter folding position to permit rotation of the pole sections, said stretcher bars and pole supporting means having cooperating portions engageable to limit relative pivotal movement between the bars and means upon the latter being in alinement on each pole and the litter expanded.

6. In a collapsible folding litter, a pair of sectional side poles each having a hinge at its central portion operable to permit folding of the pole sections on each other in one rotational position and to resist folding of the pole sections in a second rotational position, sleeves arranged in oppositely disposed pairs and supporting said pole sections for rotation at points remote from the hinges, said sleeves having slots extending circumferentially thereof, pins extending from said pole sections and engaging in said slots, said slots and pins limiting rotation of the poles in said sleeves, stretcher bars each consisting of a pair of pivotally connected sections, pivot means connecting the ends of each stretcher bar to the sleeves of a respective pair, and lugs on said stretcher bar sections engaging over said pins upon the pins being located at those ends of the slots at which the hinges of the pole sections are in non-folding positions, said stretcher bars and sleeves having cooperating portions engageable to limit relative pivoted movement between the bars and sleeves upon th litter being in alinement on each pole and the stretcher bars positioned to expand the litter.

7. In a collapsible folding litter, a pair of sectional side poles each having a hinge at its central portion operable to permit folding of the pole sections on each other in one rotational position and to resist folding of the pole sections in a second rotational position, means rotatably supporting the pole sections remote from the hinges, said means being arranged in oppositely disposed pairs, means to lock said poles against rotation upon expansion of the litter, litter expansion means arranged to force said poles apart and to collapse and draw said poles toward each other, and cooperating means on the litter expansion means and poles engageable when the litter is expanded to hold the poles against rotation and disengaged to permit rotation of the poles upon the collapsible positioning of the expansion means.

8. In a collapsible folding litter, a pair of sectional side poles each having a hinge at its central portion operable to permit folding of the pole sections on each other in one rotational position and to resist folding of the pole sections in a second rotational position, sleeves arranged in oppositely disposed pairs and supporting said pole sections for rotation at points remote from the hinges, said sleeves having slots extending circumferentially thereof, pins extending from said pole sections and engaging in said slots, said slots and pins limiting rotation of the poles in said sleeves, stretcher bars each consisting of a pair of pivotally connected sections, each of said stretcher bars having an offset end, a pivot connecting the offset stretcher bar end to a respective sleeve, and a shoulder formed on said stretcher bar at said offset end and engaging a respective pin to lock the latter against one end of its slot whereby to prevent rotation of the respective pole section and limit movement of the respective stretcher bar.

JOE J. ETTINGER.